Patented Nov. 11, 1941

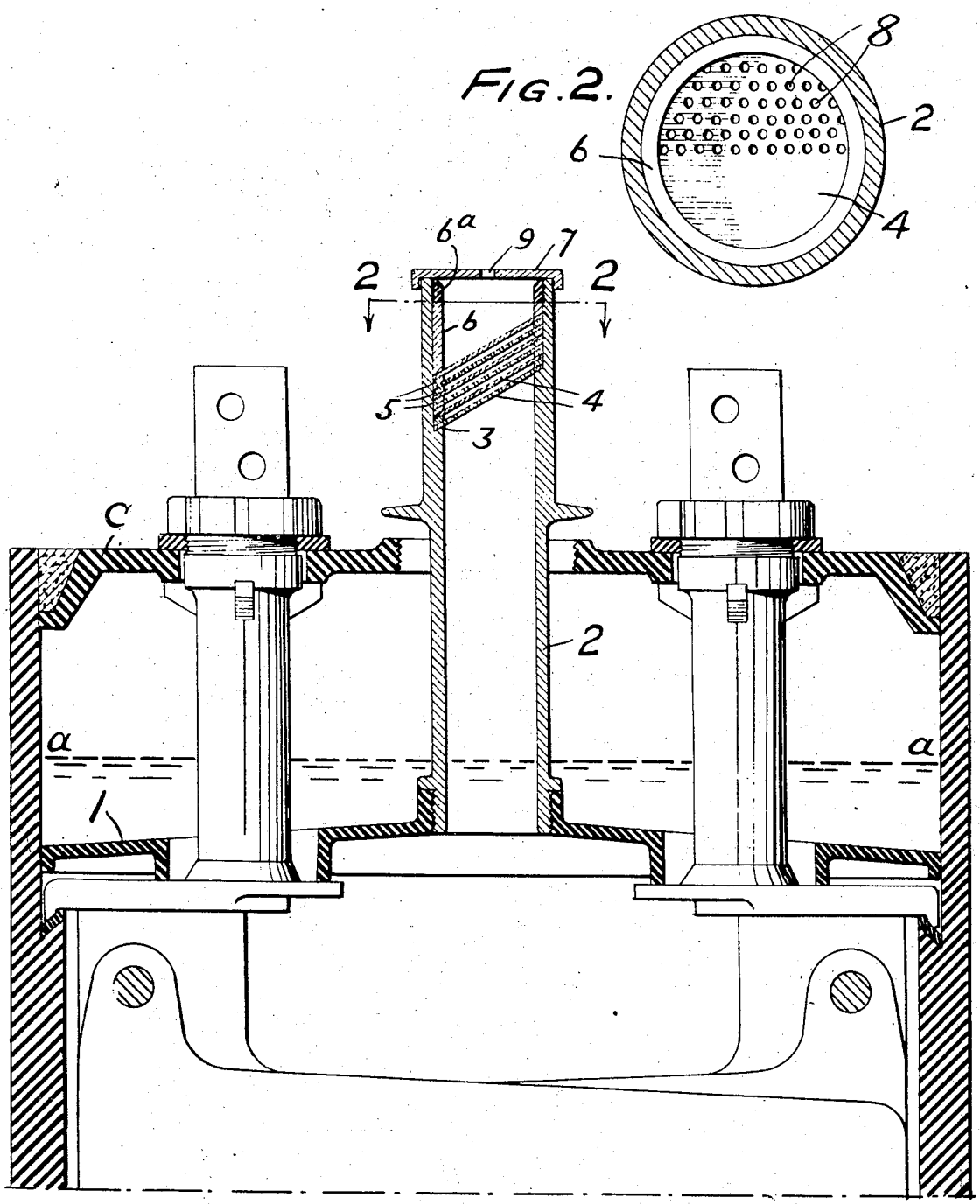

2,262,059

UNITED STATES PATENT OFFICE 2,262,059

STORAGE BATTERY

Edward W. Smith, Philadelphia, Pa., assignor to The Electric Storage Battery Company, Philadelphia, Pa., a corporation of New Jersey Application February 6, 1939, Serial No. 254,824

2 Claims. (Cl. 136—177)

Hitherto storage batteries having the usual cover have been provided with a gas cover arranged beneath the electrolyte and provided with a vent tube extending through the gas cover and past the other cover and upward above the cell. The purpose of this construction was to avoid an accumulation of explosive gas within the cell proper and to conduct such gas through the tube and out of the cell into the atmosphere. In practice the construction worked very well in that explosion within the cell were avoided. However, in the neighborhood of the base of the tube, there was frequently formed during the charge, an accumulation of foam, and in the event of an explosion in the tube, electrolyte contained in this foam was expelled from the open end of the tube. In this connection, it may be stated that the gas referred to is evolved when the battery is charged and that it may, on rare occasions, become accidentally ignited by carelessness of an attendant or even when the attendant, taking a reading from the cell with hydrometer or other instrument, may establish the necessary conditions to produce a static spark.

The principal object of the present invention is to overcome the defect referred to and to prevent the emission from the open end of the tube of electrolyte contained in the foam at the base of the tube and to which reference has been made.

Another object of the invention is to provide simple, comparatively inexpensive and reliable means for accomplishing the objects stated.

Other objects of the invention will appear from the following description at the end of which the invention will be claimed.

Generally stated, the invention consists in a set of baffle plates having openings therein and disposed in the upper portion of the tube to which reference has been made and arranged in inclined position to drain back into the cell the electrolyte caught by them.

The invention also comprises the improvements to be presently described and finally claimed.

In the following description reference will be made to the accompanying drawing forming part hereof and in which, Figure 1 is a transverse sectional view of a storage battery cell embodying features of the invention; and Figure 2 is a top or plan view of Figure 1 taken on the line 2—2.

Referring to the drawing, the gas cover 1 communicates through the tube 2 with the atmosphere and it serves to direct gases generated during charging through the tube to the atmosphere and these provisions prevent the accumulation of such gases in the space between the level of the electrolyte, indicated at $a$—$a$, and the usual cover $c$ which is sealed to the battery container. From this construction it results that the explosive gases are confined to the tube 2 and if they are ignited the explosion is relieved through the open end of the tube, but there is an accumulation of gas and electrolyte in the form of foam at the bottom of the tube 2 and in the neighborhood of the place where it opens through the gas cover 1. In the event of an explosion the electrolyte held in this foam is squirted out at the top open end of the tube. However, this is prevented by provisions which will now be described. The tube 2 is provided with an inclined seat 3 and on this seat are arranged a set or series of baffle plates 4 alternating with spacing elements 5. On top of the baffle plates and spacers is arranged a sleeve 6 secured into the tube 2 by a lock ring 6a and having a beveled end. The baffle plates and the spacers are elliptical in form and as shown the baffle plates on one side of the longer axis are perforated as at 8, and on the other side they are imperforate. The baffle plates are so arranged that the perforate portions of one plate come opposite the imperforate portions of the adjacent plates. The purpose of the baffle plates is to catch and detain any electrolyte that may reach them in consequence of an explosion. The baffle plates are inclined in order that any electrolyte caught by them may drain back into the cell. 7 indicates a cover provided with a small opening 9 through which gas may ordinarily escape. The cover is shown as detached from the tube 2 and in the event of an explosion it may be blown off the tube without causing any damage or inconvenience because it is relatively small and light. The described arrangement of baffle plates provides ready egress for the gas generated in the cell and rising through the tube 11. While at the same time owing to the staggered arrangement of perforations and solid material any considerable amount of electrolyte which may be ejected upward is effectively trapped and prevented from splashing up through the tube which will have been opened by the blowing off of the loose cover 7.

It will be obvious that details of construction may be varied without departing from the principles involved. Therefore, the invention is not limited to the exact construction and arrangement shown. Some of the detail changes, which do not require illustration because of their simplicity, are referred to. The baffle plates may be perforated over the whole surface with the holes spaced relatively far apart and the adjacent plates may be so arranged that the holes in one face the solid portions of the other, thus preventing direct ejection of liquid through the assembly. The holes shown in Figure 2 may be unified so as to provide an opening commensurate in size with the area occupied by the perforated portion of the plate. Again the spacers 5 may be made integral with the baffles and they may be in the form of ribs or feet.

It may be remarked the baffles may be readily replaced and renewed by the simple operation of removing the sleeve 6 and this is important because an explosion of the gas is likely to shatter or distort at least some of the baffles.

I claim:

1. In a storage battery cell provided with a cover disposed above and a cover disposed beneath the electrolyte, and provided with a tube communicating through the lower cover with the electrolyte and extending past and above the upper cover and in which a small accumulation of gas may safely explode if accidentally ignited, means operative upon an explosion for opposing the escape at the top of the tube of electrolyte from an accumulation of foam in the lower portion of the tube, which comprise a ledge disposed in the tube and arranged at an inclination to its major axis, a set of elliptical baffle plates and spacers alternating therewith seated on the ledge and each baffle plate perforated on one side and blank on the other side of its major axis, said perforated portions being disposed in break joint relation, a sleeve mounted in the tube and having a beveled end overlying the plates, and a lock ring in the tube above the sleeve.

2. In a storage battery cell provided with a cover disposed above and a cover disposed beneath the electrolyte and provided with a tube communicating through the lower cover with the electrolyte and extending past and above the upper cover and in which a small accumulation of gas may safely explode if accidentally ignited, the improvement which comprises a plurality of inclined, approximately parallel baffles, spaced apart and located near the upper end of the tube, each of said baffles provided with perforations some of which are located in its lower portion and others of which are located in its upper portion, the perforations in at least two of said baffles being located in relatively staggered relation, whereby direct ejection of spray is prevented and the accumulation of liquid due to the collapse of gas bubbles passing through the upper perforations will be drained back through the lower perforations.

EDWARD W. SMITH.